United States Patent
Jones et al.

(10) Patent No.: US 7,081,991 B2
(45) Date of Patent: *Jul. 25, 2006

(54) DYE-BASED FILTER

(75) Inventors: Michael R. Jones, Cedar Rapids, IA (US); Albert N. Stuppi, Springville, IA (US); Ricky J. Johnson, Cedar Rapids, IA (US); James D. Sampica, Springville, IA (US); Leslie F. Warren, Jr., Camarillo, CA (US); Hong-Son Ryang, Camarillo, CA (US)

(73) Assignee: Rockwell Collins, Inc., Ceder Rapids, IA (US)

( * ) Notice: Subject to any disclaimer, the term of this patent is extended or adjusted under 35 U.S.C. 154(b) by 497 days.

This patent is subject to a terminal disclaimer.

(21) Appl. No.: 10/390,543

(22) Filed: Mar. 14, 2003

(65) Prior Publication Data

US 2004/0179283 A1    Sep. 16, 2004

(51) Int. Cl.
*F21V 9/04*   (2006.01)
*G02B 5/22*   (2006.01)

(52) U.S. Cl. ............... 359/359; 359/885; 362/800; 252/587

(58) Field of Classification Search ........... 359/361, 359/350, 352, 353, 359, 885, 887, 888, 889, 359/890, 891, 892; 362/19, 242, 248, 311, 362/351, 800; 252/587
See application file for complete search history.

(56) References Cited

U.S. PATENT DOCUMENTS

| | | | |
|---|---|---|---|
| 4,028,462 A | 6/1977 | Domic et al. | 423/24 |
| 4,228,490 A * | 10/1980 | Thillays | 362/311 |
| 4,763,966 A * | 8/1988 | Suzuki et al. | 252/587 |
| 5,009,986 A | 4/1991 | Kawaguchi et al. | 430/270.17 |

(Continued)

FOREIGN PATENT DOCUMENTS

EP    0 718 375 B1    6/1996

(Continued)

OTHER PUBLICATIONS

Sato et al., Spectrophotometric and Electron Spin Resonance Studies on Chloro Complexes of Manganese (II), Cobalt (II) and Copper (II) in Solvent Extraction by Trioctylamine and Trioctylmethylammonium Chloride, J. Chem. Tech. Biotechnol., 1984, 34A, 375-380.

(Continued)

*Primary Examiner*—Arnel C. Lavarias
(74) *Attorney, Agent, or Firm*—Nathan O. Jensen; Kyle Eppele

(57) ABSTRACT

A display includes a light source. The display also includes a filter positioned to receive light from the light source. The filter is a dye-based filter and attenuates light in the infrared range. The filter can be configured to have a very sharp spectral cutoff. The filter can be an NVIS filter. The display can be utilized in an avionic display system with night vision equipment. The filter can include a host polymer doped with a dye including cobalt or nickel.

21 Claims, 14 Drawing Sheets

U.S. PATENT DOCUMENTS

| | | | | |
|---|---|---|---|---|
| 5,013,634 | A | 5/1991 | Nagai | 430/270.19 |
| 5,268,788 | A | 12/1993 | Fox et al. | 359/490 |
| 5,466,755 | A * | 11/1995 | Sakagami et al. | 525/326.6 |
| 6,217,796 | B1 | 4/2001 | Hasegawa et al. | 252/587 |
| 6,512,643 | B1 | 1/2003 | Wada et al. | 359/885 |
| 6,847,173 | B1 * | 1/2005 | Berthou et al. | 315/169.3 |
| 6,863,845 | B1 * | 3/2005 | Saito et al. | 252/587 |
| 2003/0040436 | A1 | 2/2003 | Emerson et al. | 504/150 |

FOREIGN PATENT DOCUMENTS

| | | |
|---|---|---|
| FR | 2 626 981 A1 | 8/1989 |
| JP | 01184879 A * | 7/1989 |
| JP | 6-118228 A | 4/1994 |
| JP | 10-221523 A | 8/1998 |
| WO | WO 00/77547 A1 | 12/2000 |
| WO | WO 02/060224 A1 * | 8/2002 |

OTHER PUBLICATIONS

Koester et al., Electronic Spectrum of the Terachloronickelate(II) Complex at 2.2° K, Inorganic Chemistry, 1975 14(8), 1811-1817.

Kojima et al., Absorption Spectra Tetrahedral Co(II) in Single Crystals of $[N(CH_3)_4]2[CoX_4]$ (X=Cl,Br), Bulletin of the Chemical Society of Japan, 1986, 59, 859-863.

International Search Report of PCT/US2004/006860, 4 pages.

Cotton & Wilkinson Textbook "Chemistry of the Transition Elements", pp. 768-772 and 785-790, printed before Mar. 14, 2002.

* cited by examiner

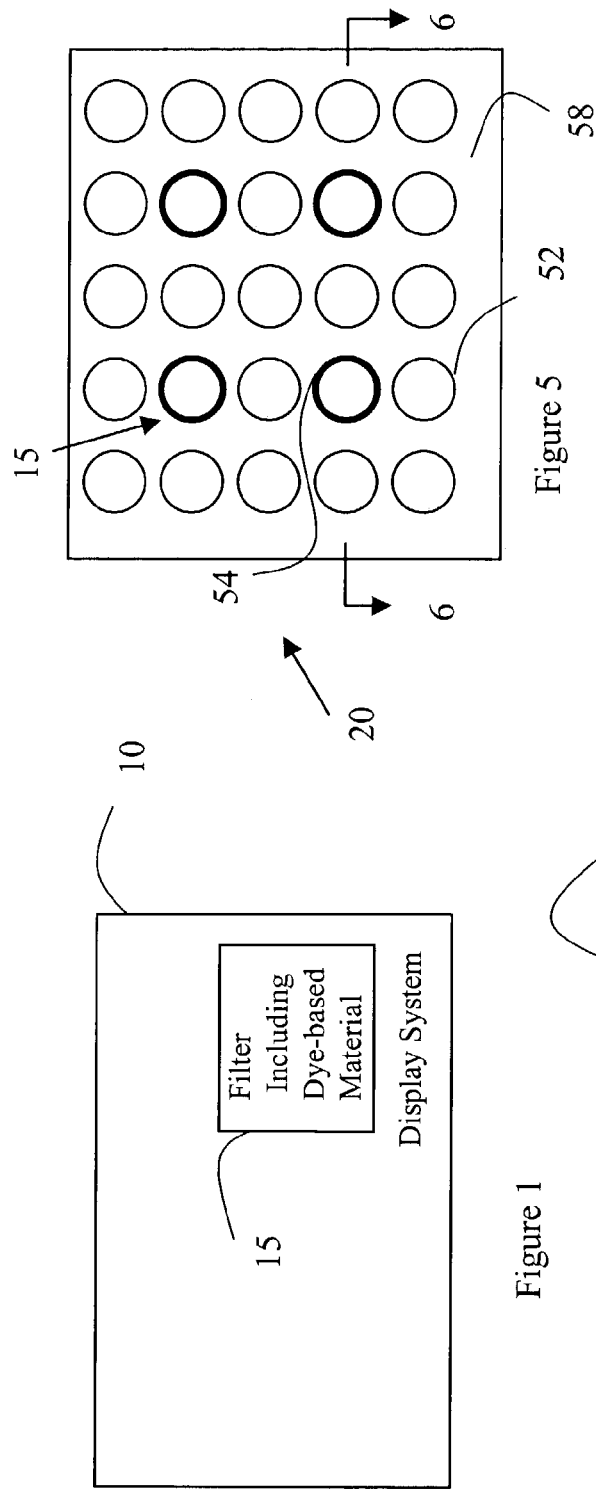
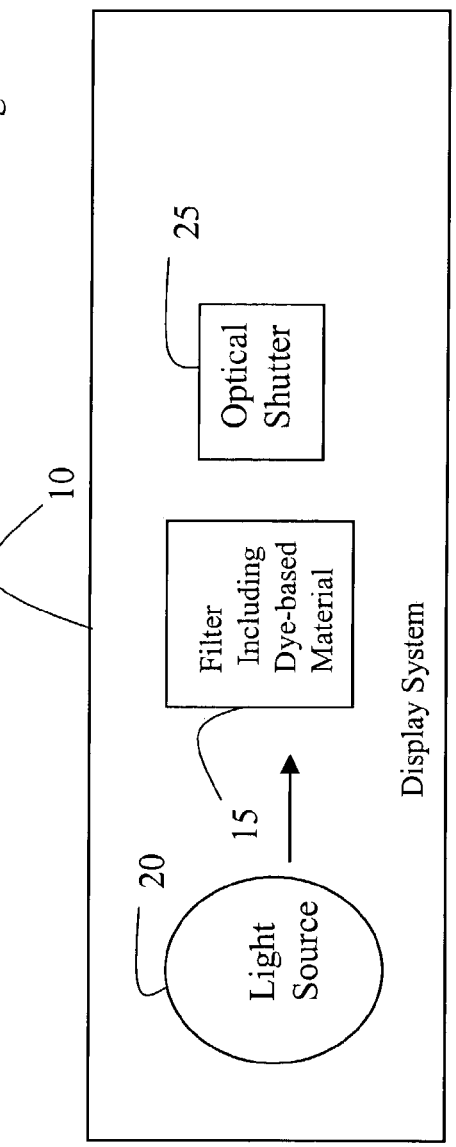
Figure 5
Figure 1
Figure 2

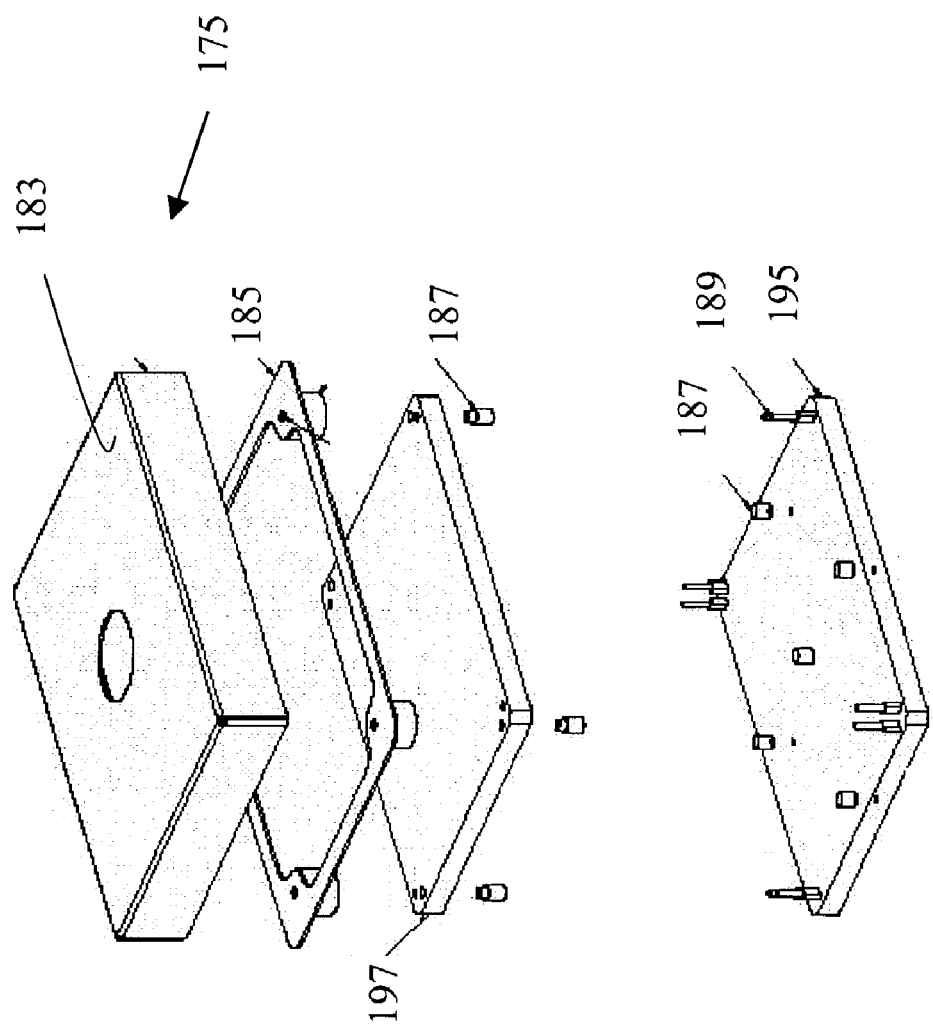

DYE-BASED FILTER

CROSS REFERENCE TO RELATED APPLICATIONS

The present application is related to application Ser. No. 09/861,310 by Mosier filed May 18, 2001 and application Ser. No. 09/861,307 by Mosier et al. filed May 18, 2001, both assigned to the Assignee of the present application. The present application is also related to application Ser. No. 10/389,347 entitled "Composition for Filter Material", Mar. 14, 2003 by Leslie F. Warren, Jr. and Hong-Son Ryang, and assigned to the Assignee of the present application.

FIELD OF THE INVENTION

The present specification relates generally to the field of displays. More particularly, the present specification relates to a method of and an apparatus for utilizing a dye-based filter in a display.

BACKGROUND OF THE INVENTION

In general, it is desirous to utilize filters in display technology, diagnostic systems, optical equipment, and other lighting systems to attenuate or accentuate particular types of electromagnetic radiation. For example, certain displays and visual equipment may accentuate particular colors in the visible light spectrum and attenuate other colors in the non-visible and the visible light spectrum. Accordingly, these displays can utilize filters to provide accentuation and attenuation for certain wavelengths of light. In another example, certain diagnostic equipment, such as x-ray equipment, may require that certain wavelengths be filtered so that film and detectors are not improperly exposed to electromagnetic radiation. Filters can be used to protect components from certain wavelengths of electromagnetic radiation.

In one particular filter application, displays and other equipment utilized in military, sports, and transportation activities are often employed in tandem with night vision equipment. These displays and equipment conventionally utilize a filter to accommodate the night vision equipment. Issues related to the use of displays and night vision equipment are described below with reference to an aviation application, although the below-mentioned issues are relevant to any applications of displays, night vision equipment, optical systems, diagnostic equipment, or lighting systems requiring attenuation or accentuation of certain wavelengths of electromagnetic radiation.

Certain aviation displays are color displays that are utilized with night vision imaging systems (NVIS). These displays provide visual information to captains, pilots, drivers and operators of ships, aircraft, and vehicles. The viewer of the color display often wears NVIS goggles at the same time he or she observes information from the color display.

Conventional NVIS goggles are sensitive to light in the infrared, near infrared, and visible red spectrum (wavelengths of light). NVIS goggles are typically sensitive to light between 425 nm and 1000 nm wavelengths. At 600 nm, the sensitivity rapidly increases and reaches a peak at 760 nm. The near infrared sensitivity of NVIS goggles allow the pilot or person wearing the goggles to see objects which cannot ordinarily be seen by the naked eye, but this same sensitivity can create night vision goggles (NVG) compatibility problems with cockpit displays. The compatibility issues fall into three categories. Category 1, 2 & 3 are, respectively, display emissions that are directly in the NVG's field of view, display emissions reflected into the NVG's field of view or display emissions diffusely scattered into the NVG's field of view. Category 1, 2 or 3 display emissions cause loss of contrast in the scene being viewed with the NVG. The contrast reduction leads to limited viewability and impaired object recognition, and it is known as NVG blooming or NVG flare.

The bloom effect is undesirable for two reasons. First, the bloom effect prevents the wearer from seeing the operational environment clearly and in fine detail. Second, the night vision goggles require a certain amount of time to be reset after a bloom effect event. Accordingly, the bloom effect is undesirable when operating a vehicle or aircraft in night vision conditions.

Conventional avionic displays designed to be utilized with NVIS equipment generally are restricted to a narrow emission, such as, single color (e.g., green) displays. The narrow emission is chosen so that it does not interfere with NVIS equipment. However, the restriction to the narrow emission significantly reduces the readability of information and the symbology provided on the displays. Further, it is difficult to highlight and differentiate large amounts of information on the display if the display is restricted to a single color.

Other conventional avionic systems have included color displays that include an NVIS filter. The color display operates in two modes: an NVIS mode (e.g., low luminance) and a daylight mode. The NVIS filter is provided between a light source used in the NVIS mode and an optical shutter, such as a liquid crystal display. The filter prevents emissions that cause NVIS equipment to bloom.

In the daylight mode, the displays use a second light source to provide light directly through the optical shutter without traversing the filter. The second light source is positioned so that its light is not provided through the NVIS filter.

Conventional NVIS filters are generally comprised of glass or other material supplemented by thin dielectric film coatings that attenuate infrared emissions or transmissions. Conventional NVIS filters typically use a thin film, multi-layer dielectric to obtain a sharp cutoff, with the knee starting between 600 nm to 630 nm. Additionally, they use an absorptive substrate to attenuate longer wavelength emissions. The conventional approach can produce a precise spectral cutoff for one viewing angle, but the cutoff shifts to shorter wavelengths with increasing viewing angle. (Reference: Optical Thin Films User's Handbook, James D. Rancourt, McGraw-Hill Optical and Electro-Optical Engineering Series, p. 68) This characteristic is particularly problematic because the wavelength at which NVIS goggles are sensitive is extremely close to the wavelength at which red emissions exist. Accordingly, a precise and stable cutoff frequency is needed in NVIS filters so that red colors can be effectively utilized on a display.

Certain conventional active matrix liquid crystal displays (AMLCDs) utilize two basic approaches for NVIS compliant backlighting. Both approaches have disadvantages associated with cost, space, and display quality.

In the first approach, a single lighting source comprised of a fluorescent lamp or LEDs is utilized in combination with a large area infrared (IR) cutoff filter (a single mode AMLCD). The IR cutoff or NVIS filter is typically a thin film dielectric stack having a surface area equal to the surface area of the AMLCD. The NVIS filter can cost $1,000 or more and is disposed in the optical path. The conventional NVIS filter can cause undesirable display performance, such as reduced backlight efficiency, red de-saturation and reduced display luminance. The conventional thin film dielectric stack also can cause viewing angle performance issues.

In the second approach, at least two lighting sources are utilized to provide a daytime and nighttime operating mode, (a dual mode AMLCD). The daytime mode utilizes either a fluorescent lamp or an LED array, and the nighttime mode utilizes a wave-guide illuminated with fluorescent stick lamps or strips of LEDs. The illumination is directed through an IR filter and into the thin edges of the waveguide. This approach has the advantage of removing the IR filter from the daytime optical path and greatly reduces the size of the IR filter. Although this approach provides a more efficient backlighting and a less expensive filter, the design of the wave-guide is complex and assembly of the AMLCD is more expensive and time consuming. Further, dual mode AMLCDs which use wave-guides require additional space around the perimeter of the AMLCD. The additional space is not available in certain space critical applications, such as on a 5ATI display or other avionic display. Also, this approach can suffer from light leaks leading to poor NVIS performance.

Further, future displays for military, sports, and transportation activities may utilize emitting technologies such as organic light-emitting diodes (OLEDs). One such technology involves flexible emissive displays. It is difficult to manufacture flexible, thin NVIS filters from conventional materials. Further, conventional NVIS filters such as thin film dielectric stacks are reflective in high ambient or daytime lighting, thereby reducing the contrast ratio of the display. A conventional thin film NVIS filter can reflect as much as 50% of the light that strikes it at the 630 nm wavelength.

Thus, there is a need for ambient lighting and display systems that can utilize inexpensive NVIS filters. Further, there is a need for a single mode display system which utilizes an inexpensive NVIS filter. Further still, there is a need for a system which can utilize an inexpensive filter having a relatively precise and stable cutoff frequency. Yet further still, there is a need for an avionic display which can utilize an inexpensive NVIS filter.

There is also a need for a dual mode display which does not require the complexity associated with wave-guides. Further, there is a need for an NVIS display which does not require additional space about the perimeter of the display. Even further, there is a need for an AMLCD display which can accommodate night vision equipment and yet is low cost, compact, and does not suffer from performance losses. Yet even further, there is a need for an NVIS filter for flexible emissive displays which is not as detrimental to contrast ratio in high ambients as conventional materials. Further still, there is also a need for a low cost filter material for absorbing infrared radiation which possesses a sharp spectral cutoff.

SUMMARY OF THE INVENTION

An exemplary embodiment relates to a display including a light source. The display includes a dye-based filter material positioned to receive light from the light source. The dye-based filter material absorbs light in the infrared range with respect to light in the visible range and has a sharp, stable cutoff.

Another exemplary embodiment relates to an avionic display system. The avionic display system includes a display configured to provide visual images in the visual frequency range and a dye-based filter material positioned to receive light associated with the visual images. The dye-based filter material attenuates light in the near-infrared range.

Still another exemplary embodiment relates to a method of manufacturing a display. The method includes providing at least one light source and coating the light source or sources with a film that receives light from the light source or sources with a dye-based filter material. The dye-based filter material attenuates light in the infrared range.

Still another exemplary embodiment relates to a display system comprising means for providing a visual image and means for filtering light to absorb the light associated with the visual image above a selected wavelength range, the selected wavelength being above 610 nm.

Still yet another embodiment relates to an NVIS filter. The NVIS filter includes a monomer or polymer host and a dye. The polymer host is doped with the dye. The resulting filter absorbs light in the near-infrared and infrared range and allows light in the visible range to pass.

BRIEF DESCRIPTION OF THE DRAWINGS

Preferred exemplary embodiments are hereinafter described with reference to the accompanying drawings, wherein like numerals denote like elements, and:

FIG. 1 is a schematic general block diagram of a display system including a dye-based filter in accordance with an exemplary embodiment;

FIG. 2 is a schematic general block diagram of an avionic display including the dye-based filter illustrated in FIG. 1 in which the dye-based filter is disposed behind an optical shutter in accordance with another exemplary embodiment;

FIG. 5 is a top view of a light source and filter for use in the display systems illustrated in FIGS. 1–3 in accordance with yet another exemplary embodiment;

FIG. 18 is an expanded view of a pair of films for the filter illustrated in FIG. 1 and the fixture illustrated in FIG. 17 in accordance with still another exemplary embodiment.

DETAILED DESCRIPTION OF THE PREFERRED EMBODIMENTS

Figure 3:
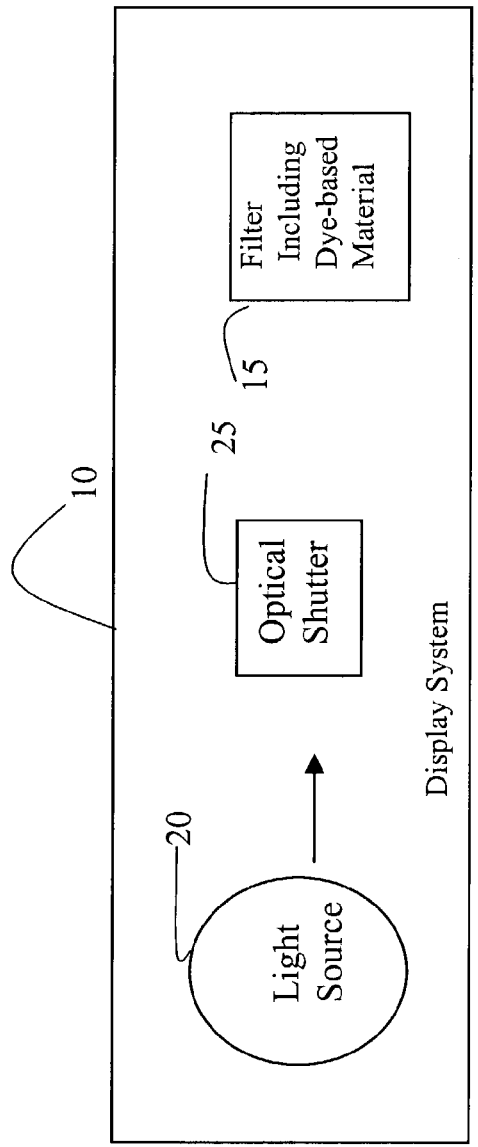
FIG. 3 is a schematic general block diagram of an avionic display including the dye-based filter illustrated in FIG. 1 in which the dye-based filter is disposed in front of an optical shutter in accordance with yet another exemplary embodiment.

With reference to FIG. 1, an exemplary display system 10 includes dye-based filter 15. For example, system 10 can be an avionic system, ground vehicle or handheld display. Although discussed below with reference to display systems, filter 15 can be used in any application requiring the filtering of light in the infrared range or other selected range. According to one example, filter 15 can be used to protect film and other detectors in diagnostic equipment, such as x-ray machines. System 10 can be utilized with sensors, targeting systems, cameras, and other optical equipment.

Filter 15 advantageously contains a dye that attenuates or absorbs light at a wavelength in the infrared range (and has a sharp spectral cutoff that is stable over viewing angle in a most preferred embodiment). In one preferred embodiment, light is absorbed so that transmittance through filter 15 is less than 10% for light having wavelengths between approximately 630 nm and 755 nm. In a most preferred embodiment, filter 15 attenuates light at a wavelength of 640 nm to 750 nm to less than 10%.

In one preferred embodiment, dye-based filter 15 includes a filter material comprised of a monomer or polymer host doped with a dye. The filter 15 preferably has a spectral transmittance characteristic with a knee between approximately 600–610 nm at approximately 70% or greater transmittance due to the characteristics of the filter material. Filter 15 preferably provides approximately 50% transmittance between 615 nm and 630 nm and provides approximately 10% transmittance between 630 nm and 638 nm. Further, filter 15 preferably has a transmittance of 5% or less between 630 nm and 650 nm and has a transmittance of $7.25 \times 10^{-4}$ percent at 720 nm. In one embodiment, the dye-based filter 15 attenuates transmittance at wavelengths between 610–750 nm or more.

In one embodiment, the dye associated with the filter material is configured to have a sharp cutoff between 600 nm and 640 nm (preferably around 610 nm to 620 nm), high transparency in the remaining visible portion of the spectrum, and non-luminance (non-fluorescence). The dye preferably includes tetrahedrally-coordinated $d^7$ and $d^8$ cobalt (2+) and nickel (2+) metal ion complexes.

For NVIS applications, the dye preferably does not have a broad tail after the cutoff wavelength and does not have significant secondary absorbence in the visible spectrum. The dye is preferably compatible with casting and injecting molding production methods.

The dye can be inorganic or organic and is preferably from a class of inorganic compounds or complexes that have absorption bands in the visible electromagnetic spectrum that are weak, and then abruptly transitions to strong absorption bands in the near-infrared electromagnetic spectrum. Ideally, the abrupt transition occurs at a wavelength between 600 nm to 630 nm, depending upon application needs. The dye can be any composition in the family of tetrahedrally coordinated transition metal ions of $d^7$ cobalt (2+) and $d^8$ nickel (2+), where the d number signifies the 3 electron configurations of the divalent (2+) metal ions.

Exemplary members of this family include deep blue $CoCl_4^{2-}$ and $NiCl_4^{2-}$ ions which are generally generated only in certain non-aqueous solutions. For example, the tetrachlorocobalt complex has its absorption maximum at approximately 700 nm with a molar absorbence of approximately 600 nm.

These dianionic $MX_4^{2-}$ species, where X represents a halide, are typically isolated from compatible organic solvents with relatively large quaternary ammonium counterions, such as tetraethylammonium $(C_2H_5)_4N^+$, as sparingly soluble salts. However, these compounds, while stable in the solid state, are relatively reactive and are prone to dissociation in polar organic solvents and subsequent loss of optical integrity upon dissolution and polar organic solvents, particularly water.

With respect to filter applications, the chloro and bromo complexes of both cobalt and nickel have spectral properties of interest, namely a non-luminescent broadband absorption with a steep cutoff from approximately 600 nm to 750 nm. However, these compounds can have low solubilities and pronounced tendencies to crystallize due to the high ionic charge (2–) of the colored $MX_4^{2-}$ ions. Through experimentation Applicants have found optically transparent quaternary ammonium counterions which are effective at stabilizing and solubilizing these species while imparting little tendency toward crystallization, namely the methyltrioctylammonium (or TOMA) ion, $CH_3N[(CH_2)_7CH_3]_3^+$, which is commercially available as its bromide and chloride salts. The TOMA salts of the $MX_4^{2-}$ ions (where M is Co or Ni and X is a halide, e.g., $(TOMA)_2CoBr_4$), are useful as the dye for the filter material of filter 15.

The counterions of these complexes generally do not need to be restricted to TOMA, and can include any related low symmetry cations or cation mixtures which stabilize and solubilize these anion species as well as hinder their crystallizations. $MX_4^{2-}$ salts of this type would essentially be liquids or low-melting solids with little propensity to crystallize. Cations utilized in ionic liquid formulations, notably those based on unsymmetrically substituted imidazolium ions, can be utilized with this family of dyes.

A characteristic feature of $MX_4^{2-}$ complexes involves the unique steepness of their absorption bands, unlike that of most dyes, providing cutoffs ranging from approximately 580 nm for the tetrachloro systems to approximately 630 nm for the tetrabromo ions. The exact cutoff is tailorable to a degree within these limits by forming mixed chloro/bromo species, such as $CoBr_2Cl_2^{2-}$, which exhibits a band at approximately 620 nm. Similarly, Applicants have found that a mixture of cobalt and nickel complexes can be used to obtain shifted and/or broadened spectral bands. Cobalt complexes can be more useful than nickel systems due to their greater stabilizations to dissociations, notably towards water. In addition, the cobalt dyes tend to be more transparent in the visible portion of the spectrum.

Related tetrahedrally coordinated $d^7$ cobalt (2+) and $d^8$ nickel (2+) complexes with different halides, pseudohalides, and other ligands (coordinating groups) can give rise to strong absorption bands and also can have potential as sharp cutoff dyes. Such species can have high ionic charges ranging from 2+ to 2−. Two examples include the dicationic triphenylphosphine oxide complex $Co(OPPh_3)_4^{2+}$ and the neutral dioctylphosphate complex $Co[(octO)_2PO_2]_2^0$, both of which have strong absorption bands above 600 nm.

Generally, these systems, notably the ionic ones, are prone to dissociation in polar media and it would generally be beneficial for counterions to impart properties similar to the TOMA ions, which, due to their $MX_4^{2-}$ salts, have little tendency to crystallize. The dyes such as the sharp cutoff cyan dye filters are not necessarily restricted to NVIS applications and can be usable in other areas, such as imaging and photography.

The low melting nature (e.g., melting point considerably below room temperature (below 60° F.)) and lack of crystallization of the $(TOMA)_2MX_4$ salts enables their use in filters as neat films, for example, sandwiched between transparent substrates. There is no dissociation of the ionic species in this case, so the optical integrity of the complexes is fully retained. Alternatively, the dyes can be incorporated within a low-polarity polymer matrix such as an acrylate by slow solvent evaporation of a solution of the dye salt and the polymer. For example, slow evaporation of a mixture of a poly(acrylate) polymer and $(TOMA)_2CoBr_4$ in 1,2-dichloroethane or dichloromethane affords free-standing, optically clear cyan films. A third approach is to incorporate these dye materials into a thermally or photochemically curable resin system, such as ultra violet (UV) curable acrylic (or UVA) or an epoxy. However, the UVA or epoxy component selection can be critical with these dyes due to the propensity of the metal ions, which are released by dissociation of the $MX_4^{2-}$ species, to interfere with the curing process.

The following examples describe the preparation and properties of the dyes for dye-based filter 15. The spectral responses of the dyes of Examples 1–8 are provided in FIGS. 9–12, both of which are discussed below. FIGS. 9–12 have a y-axis denoting transmission in percentage and an x-axis denoting wavelength in nanometers.

Figure 9:
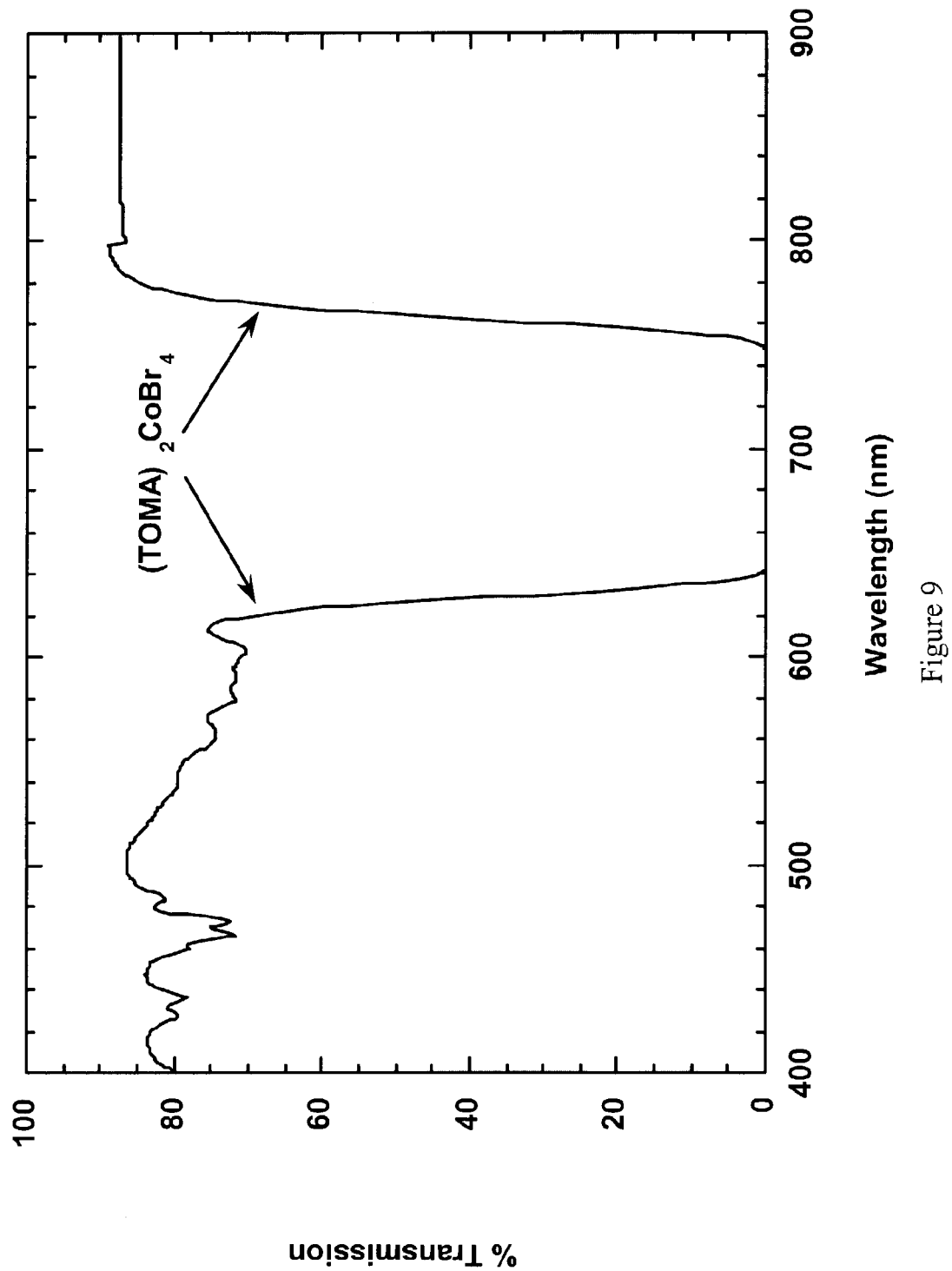
FIG. 9 is a graph showing spectral transmittance for Example 1 of the dye for the dye-based filter illustrated in FIG. 1.

FIG. 9 is a transmission spectrum of a 150 micron thick film of neat $(TOMA)_2CoBr_4$ fabricated according to Example 1 below. The sharp spectral cutoff with a 50% transmission point at 630 nm is a unique spectral feature for a dye-based filter. This spectral characteristic is applicable to many lighting and display systems which require NVIS compliance. Additionally the sharp spectral cut-on with a 50% transmission point at 760 nm is also a unique spectral feature for a dye-based filter. This spectral characteristic is useful for optical measurement equipment designed for the infrared diagnostics.

Figure 10:
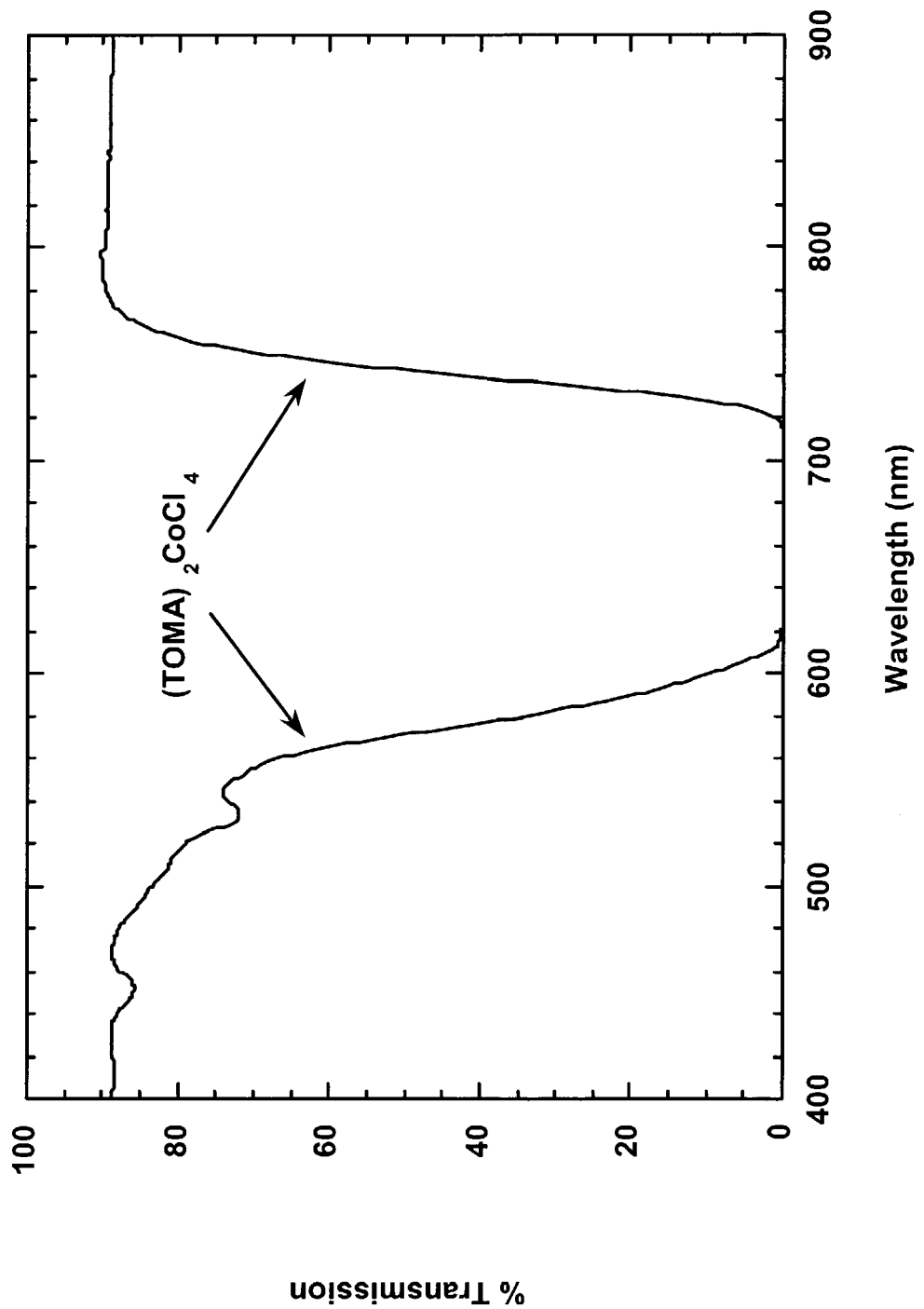
FIG. 10 is a graph showing spectral transmittance of Example 2 of the dye for the dye-based filter illustrated in FIG. 1.

FIG. 10 is similar to FIG. 9 and shows the transmission spectrum of neat $(TOMA)_2CoCl_4$ manufactured according to Example 2 below.

Figure 11:
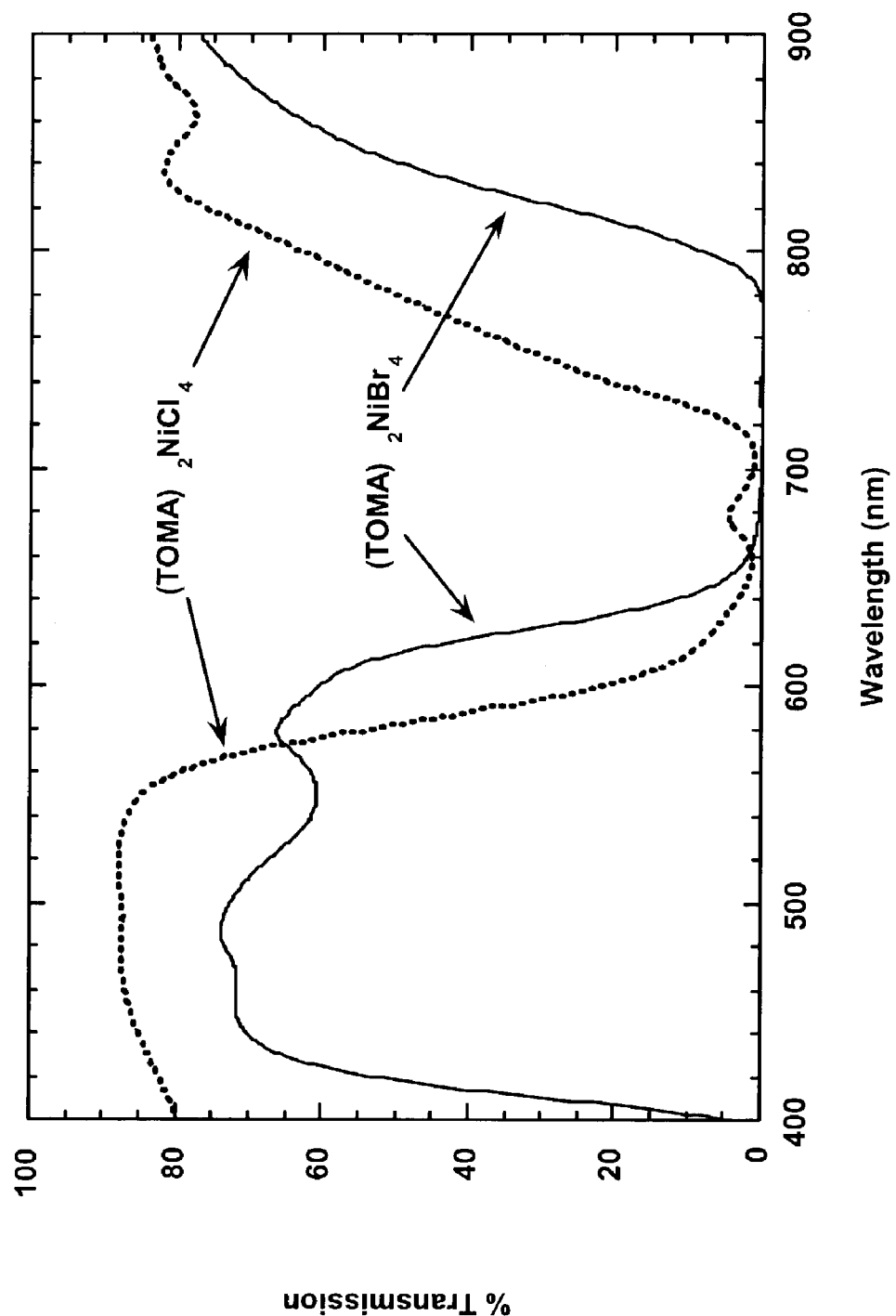
FIG. 11 is a graph showing spectral transmittance for Examples 3 and 4 of the dye for the dye-based filter illustrated in FIG. 1.

FIG. 11 is similar to FIG. 10 and shows the transmission spectrum of neat $(TOMA)_2NiBr_4$ and a toluene solution of $(TOMA)_2NiCl_4$ according to Examples 3 and 4. The transmission spectrum of $(TOMA)_2NiBr_4$ is shown by a solid line and the transmission spectrum of $(TOMA)_2NiCl_4$ is shown by a dotted line.

Figure 12:
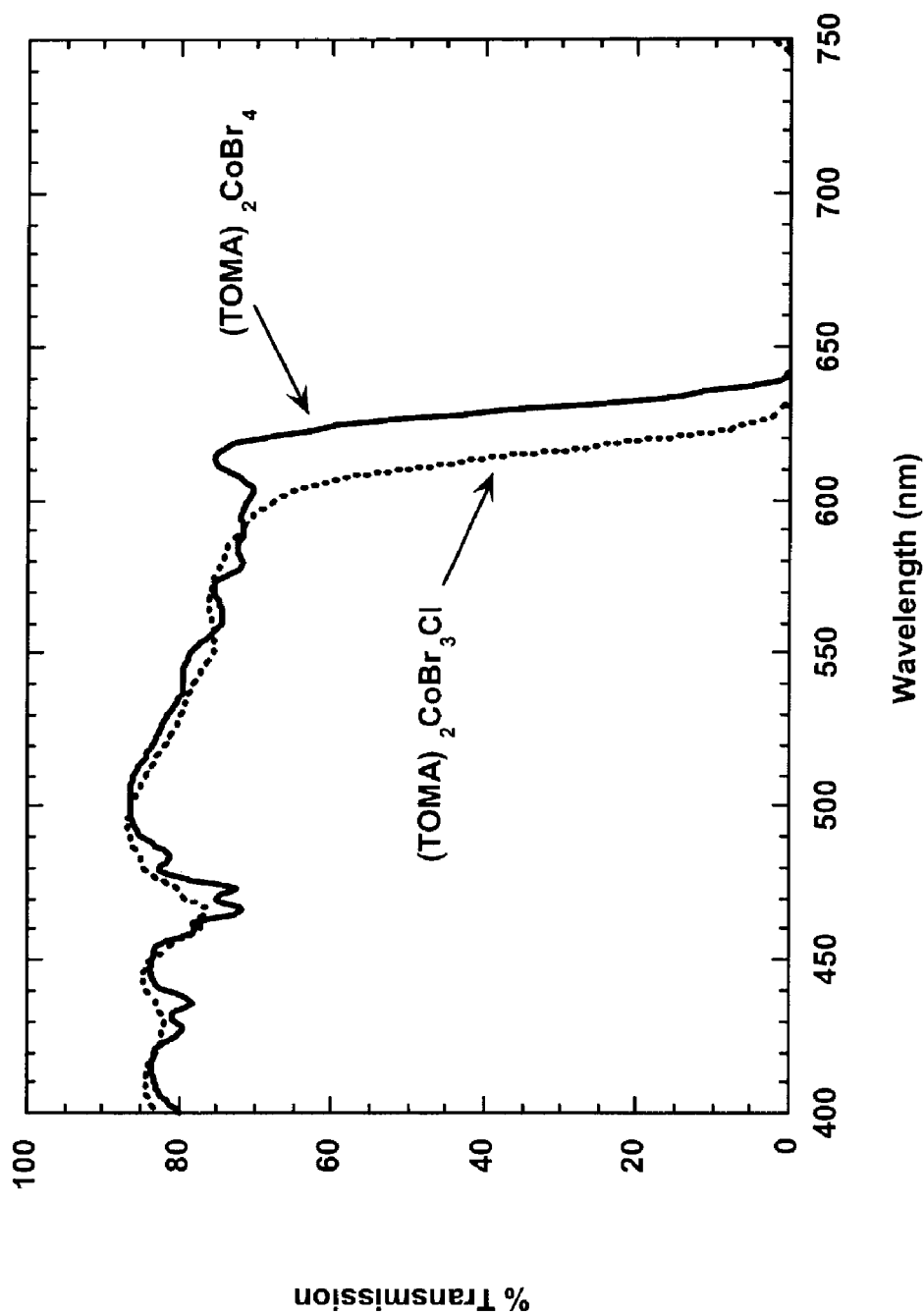
FIG. 12 is a graph showing spectral transmittance for Examples 5 and 6 of the dye for the dye-based filter illustrated in FIG. 1.

FIG. 12 is similar to FIG. 11 and shows the transmission spectrum comparison of neat (TOMA) salts of $CoBr_4^{2-}$ and $CoBr_3Cl^-$ ions according to Examples 5 and 6. The transmission spectrum of the $(TOMA)_2CoBr_4$ is shown by a solid line and the transmission spectrum of $(TOMA)_2CoBr_3Cl$ is shown in a dotted line.

Figure 13:
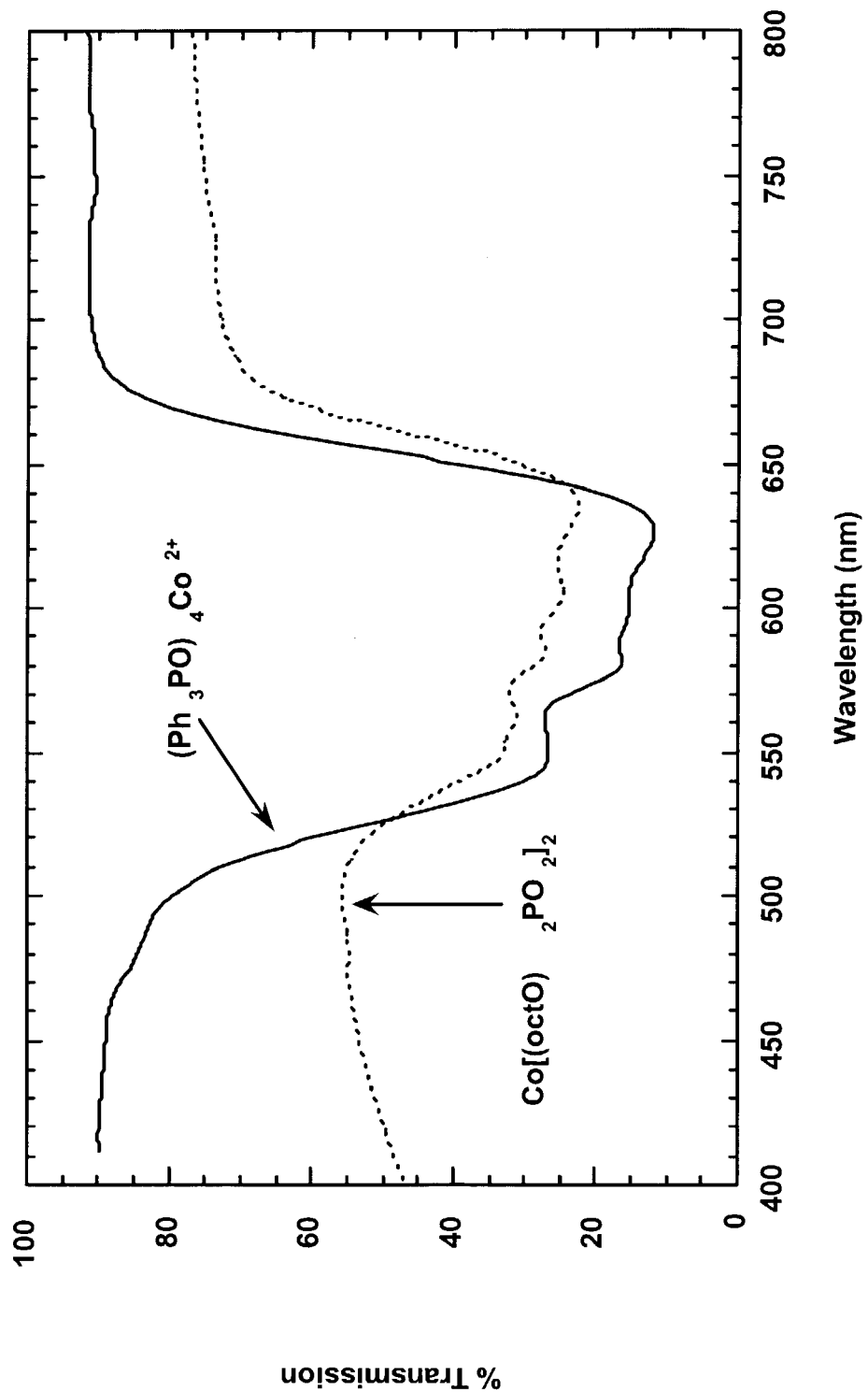
FIG. 13 is a graph showing spectral transmittance for Examples 7 and 8 of the dye for the dye-based filter illustrated in FIG. 1.

FIG. 13 is similar to FIG. 12 and shows a transmission spectrum of tetrahedrally coordinated cobalt (2+) complexes $(Ph_3PO)_4Co^{2+}$ in 1,2-dichloroethane and $Co[(octO)_2PO_2]_2$ in hexane according to Examples 7 and 8. The transmission spectra of $Co[(octO)_2PO_2]_2$ in hexane is shown in a dashed line and the transmission spectrum of $(Ph_3PO)_4Co^{2+}$ in 1,2-dichloroethane being shown by a solid line.

EXAMPLE 1

Preparation of $(TOMA)_2CoBr_4$: Anhydrous $CoBr_2$, (2.30 g) and methyltrioctylammonium bromide (TOMABr from Aldrich Chemical Company, Inc.) (9.73 g) were added to 200 ml of 1-propanol and heated to reflux until all solids dissolved (about 1 hour). The resulting solution was cooled to room temperature, treated with activated charcoal for 1 hour, and filtered. The solution was then evaporated in a dish on a 60° C. hotplate overnight to a viscous deep blue oil. Residual solvent was removed with a vacuum. Comparable results were obtained using ethyl acetate as the solvent. The low melting, waxy $(TOMA)_2CoBr_4$ obtained in this fashion generally showed no tendency to crystallize, but occasional batches would upon prolonged standing at room temperature. Slight deviations from exact 2 $TOMA^+Br^-$: 1 $CoBr_2$ stoichiometry, as was the usual case, appeared to prevent crystallization. FIG. 9 shows a transmission spectrum of a neat thin film of this salt sandwiched between glass slides with its characteristic sharp cutoff around between 600 and 630 nm, (preferably 610 nm). While polar solvents would generally dissociate the complex, i.e., break it apart into its component ions, certain chlorinated solvents such as dichloromethane and 1,2-dichloroethane dissolved the salt intact, as determined spectroscopically. Removal of the polar solvents, by evaporation or vacuum, regenerated the $CoBr_4^{2-}$ complex. Films or solutions of this salt, while stable to oxygen, were susceptible in the long term to decolorization by reaction with water vapor and required protection or sealing.

EXAMPLE 2

Preparation of $(TOMA)_2CoCl_4$: This complex was prepared in the same fashion as the bromide system in Example 1, starting, however, with the chloride salts $CoCl_2.6H_2O$ and methyltrioctylammonium chloride, the latter being commercially available from Aldrich Chemical Company, Inc. as Aliquat® 336 (a mixture of $C_8$ and $C_{10}$ chains with $C_8$ predominating). The resulting deep blue oil was less viscous than the bromide salt and exhibited a transmission spectrum with a blue-shifted cutoff around 600 nm as shown in FIG. 10.

EXAMPLE 3

Preparation of TOMA nickel halide dyes: The deep blue $(TOMA)_2NiCl_4$ complex was prepared in the same manner as their cobalt analogs in Examples 1 and 2, starting with the corresponding nickel and TOMA halide salts. The complex appeared to be less stable to water vapor than the cobalt systems. The transmission spectrum is shown in FIG. 11.

EXAMPLE 4

Preparation of TOMA nickel halide dyes: The $(TOMA)_2NiBr_4$ complex was prepared in the same manner as their cobalt analogs in Examples 1 and 2, starting with the corresponding nickel and TOMA halide salts. The complex appeared to be less stable to water vapor than the cobalt systems. The transmission spectrum is shown in FIG. 11.

EXAMPLE 5

Preparation of $(TOMA)_2CoBr_3Cl$: TOMABr, (10.96 g), $CoBr_2$ (1.30 g) and $CoCl_2 \cdot 6H_2O$, 1.41 g, were treated in i-propanol as in Example 1. The resulting deep blue waxy $CoBr_3Cl^{2-}$ salt exhibited the transmission spectrum shown in FIG. 12, with a slightly blue shifted band relative to the tetrabromo species.

EXAMPLE 6

Preparation of $(TOMA)_2CoBr_2Cl_2$: The $CoBr_2Cl_2^{2-}$ salt was made similarly to Example 5 from a stoichiometric ratio of bromide and chloride salts and exhibited a slightly more blue shifted spectrum than that achieved in Example 5.

EXAMPLE 7

Other Tetrahedrally Coordinated Co(2+) Complexes: The representative deep blue dicationic tetra(triphenylphosphine oxide)cobalt(2+) ion, $(Ph_3PO)_4Co^{2+}$, was generated in the reaction of $Co(BF_4)_2$ dioxanate with PhPO in 1,2-dichloroethane. The solution spectrum of the resulting product is shown in FIG. 13.

EXAMPLE 8

Other Tetrahedrally Coordinated Co(2+) Complexes: A representative neutral complex, $Co[(octO)_2PO_2]_2$, was generated by shaking cobalt acetate with a hexane solution of bis(2-ethylhexyl)hydrogenphosphate (also known as dioctylphosphate), whereupon the deep blue complex extracted into the hexane phase.

The dyes discussed above in Examples 1–8 and mixtures there of are preferably doped into UV curable Co/Acrylic systems. As discussed below with reference to Examples 9 and 10, doping of dyes into a monomer or polymer host media is described.

EXAMPLE 9

Bis(methyltrioctylammonium)tetrabromocobaltate (2.24 gm) and methyltrioctylammoniumbromide (0.18 gm) were charged into a brown glass bottle. Subsequently, three acrylic monomers, 2-hydroxyethyl methacrylate (1.94 gm), propoxylated trimethylolpropane triacrylate (4.48 gm), and methacryloxypropyltris(trimethylsiloxy)siloxane (1.05 gm) were added. The resulting mixture was stirred at ambient temperature until homogenized. Finally, benzyl dimethyl ketal photoinitiator (0.1 gm) was dissolved into the solution in a dark place (or under yellow light). The final mixture was then sandwiched between glass substrates (4 mil gap) and exposed to UV (using a 300 W UV lamp) for three minutes under nitrogen to obtain a clear blue-green film.

EXAMPLE 10

Bis(methyltrioctylammonium)tetrabromocobaltate (2.22 gm) and methyltrioctylammoniumbromide (0.18 gm) were charged into a brown glass bottle. Subsequently, three acrylic monomers, 2-hydroxyethyl methacrylate (1.94 gm), alkoxylated hexanediol diacrylate (4.47 gm), and methacryloxypropyltris(trimethylsiloxy)siloxane (1.06 gm) were added. The resulting mixture was stirred at ambient temperature until homogenized. Finally, benzyl dimethyl ketal photoinitiator (0.13 gm) was dissolved into the solution in a dark place (or under yellow light). The final mixture was then sandwiched between glasses (4 mil gap) and exposed to UV (using a 300 W UV lamp) for three minutes under nitrogen to obtain a clear blue-green film.

With reference to FIGS. 1 and 2, system 10 can be implemented as a single mode or dual mode display system, such as a dual mode AMLCD system or single mode AMLCD system. System 10 can utilize either fluorescent lamps or LED arrays or even emissive display screens. The dye-based filter material for filter 15 can include any of the materials described in Examples 1–10 and be provided in a sandwich of polyester films, can be coated on light emitting sources or screens, or otherwise provided in system 10 to attenuate light in the near-infrared and infrared range. Preferably, filter 15 is configured for use as an NVIS filter. The material for filter 15 includes a monomer or polymer host doped with a dye. Preferably, the dye material achieves thermal stability, sharp spectral cutoff regions, and viscosity that is compatible with automatic dispensing machines. Sharp spectral cutoffs can be a decrease from 80% transmittance to less than 10% transmittance across 25 nm or a drop of 70% or more transmittance across 25 nm or less (e.g., an at least 4.5% drop in transmittance per nm). The slope of a sharp spectral cutoff can be −0.0263 percent transmission per nm (% T/nm). In another embodiment, sharp spectral cutoffs can be more broadly defined as a decrease in transmittance from more than 50%° to less than 15% over an interval of less than 50 nm. When included in a monomer or polymer, the average refractive index of the dye and monomer is preferably tailored to match the refractive index of the adjacent substrates.

The monomer or polymer host for the dye can include a number of suitable chemicals. According to one embodiment, a polymer such as poly(methyl methacrylate-co-butyl methacrylate) or poly(methylmethacrylate) (PMMA) can be utilized as a host material. In another embodiment, the dye counterion can contain an aralalkyl group, such as a benzyl group, such as a benzyltrialkylammonium ion. In another embodiment, the ultraviolet light curable acrylic compositions compatible with the dyes described above can be utilized. In one embodiment, the percentage of dye to host can be 30% to 70%.

By using a dye-based filter 15, Applicants have achieved significant benefits for both single mode and dual mode display systems. For example, filter 15 can allow system 10 to achieve better space and power efficiency, cost reductions, improved luminance, and improved chromaticity, especially in the red range. These advantages are realized by fabricating an absorptive filter having a very sharp spectral cutoff. Further, system 10 can be designed without edge-lit waveguide systems, complex assembly processes, and without perimeter space increasing. System 10 can be utilized as an avionic display such as a 5ATI display, an MFD268 display, or a DU9802 display manufactured by Rockwell Collins, Inc.

Display system 10 can be utilized in any type of application involving the presentation of visual information. Display system 10 can be utilized in military, transportation, communication, or sporting applications where it is desirous to accentuate or attenuate electromagnetic radiation at particular frequencies.

Display system 10 can be a lighted switch, button or bezel key used in avionic or ground vehicle cockpits. Display system 10 can be an avionic display, such as a primary flight display, a radar display, a weather display, a targeting display, etc. Display 10 can also be a display utilized in military applications, communication applications, or other visual systems where a cutoff filter is necessary. Filter 15 can be utilized to protect components from electromagnetic emissions in the attenuation range of filter 15.

As shown in FIGS. 1–4, light provided to the viewer is generally provided from system 10 at the left side of the drawing.

With reference to FIG. 2, display system 10 includes a light source 20, dye-based filter 15, and an optical shutter 25. Light source 20 can be an LED, an LED array, an incandescent lamp, a fluorescent light, or other light generator for a display system 10. Light source 20 can include two or more light sources or dual light sources for a daylight and night mode.

Light source 20 preferably includes super-bright white LEDs arranged in an array. Alternatively, other types or colors of LEDs can be utilized. Light from light source 20 is provided through dye-based filter 15 to optical shutter 25. Optical shutter 25 can be any display element for providing images to view on display system 10.

In one embodiment, optical shutter 25 is an active matrix liquid crystal display (AMLCD). Filter 15 is provided between light source 20 and shutter 25. Shutter 25 can be any device for providing a variable image. Alternatively, optical shutter 25 can also be a plate, switch or control for providing fixed visual images.

With reference to FIG. 3, an alternative embodiment of system 10 provides dye-based filter material after optical shutter 25. Optical shutter 25 in FIG. 3 is provided between light source 20 and dye-based filter material 15.

Figure 4:
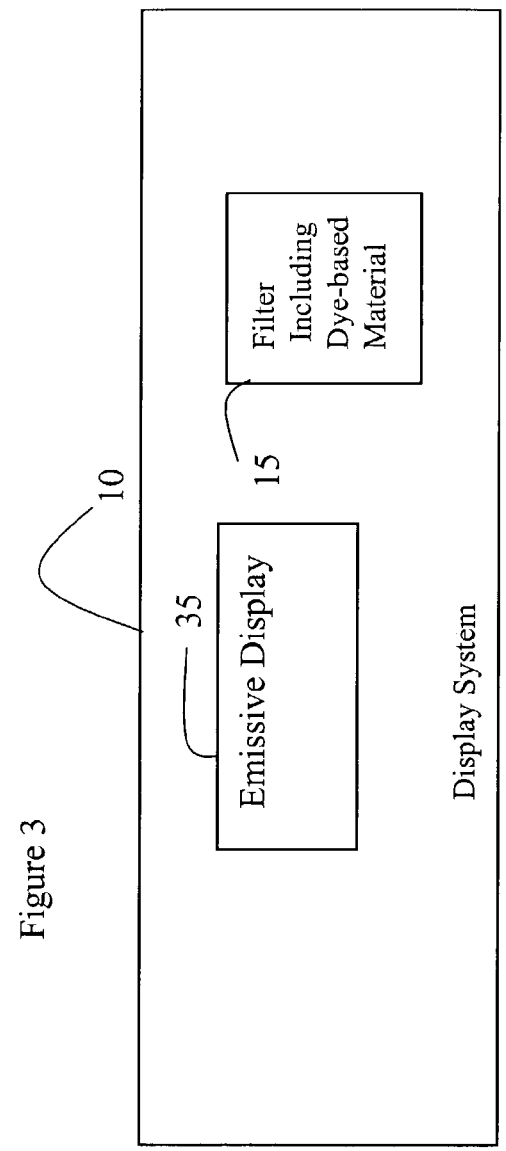
FIG. 4 is a schematic general block diagram of an avionic display including the dye-based filter illustrated in FIG. 1 in which the dye-based filter is disposed in front of an emissive display in accordance with still another exemplary embodiment.

With reference to FIG. 4, system 10 is embodied as including an emissive display, such as a flexible OLED display. In this embodiment, dye-based filter 15 is provided between emissive display 35 and the viewer. Alternatively, the emissive display can be a CRT. The screen of the emissive display can be rigid or flexible, flat or curved.

With reference to FIG. 5, light source 20 includes display filter 15 on certain LEDs 52 (e.g., LEDs 54). LEDs 52 and 54 are advantageously provided on circuit board 58. Circuit board 58 can be a flexible or rigid circuit board for housing LEDs.

In a preferred embodiment, the matrix of LEDs 52 and 54 is a 33 by 30 matrix of 990 LEDs. In one embodiment, every other LED in every other row is coated with dye-based filter material to attenuate radiation in the infrared range (shown as LEDs 54). In another alternative, each and every LED is coated with the dye-based filter material. In addition to the dye coating, a polymer or monomer overcoat is desirable to seal the dye from the environment. A suitable overcoat is a UV curable adhesive or PMMA polymer.

Figure 6:
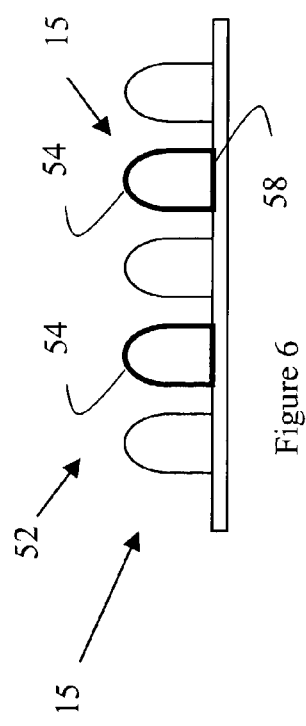
FIG. 6 is a cross-sectional view of the light source and filter illustrated in FIG. 5 taken about line 6—6.

In FIG. 6, the fourth row of LEDs is shown having LEDs 54 (every other LED in that row) coated with the dye-based filter material. In this embodiment, system 10 can be operated in a dual mode in which non-coated LEDs 52 are operated in the daylight mode and only coated LEDs 54 are operated in the night mode. The coating of LEDs 54 is represented by a thick line in FIGS. 5 and 6.

Such a dual mode approach overcomes the disadvantages associated with conventional dual mode designs. Various configurations can be utilized to coat the lenses or covers associated with LEDs 52. In an alternative embodiment, a film including the dye-based material can be provided above LEDs 52. In a single mode approach all LEDs 52 can be coated similar to LEDs 54 or the dye-based material can be sealed between substrates. In another embodiment, the lenses of LEDs can include the dye based material. The superior spectral cutoff characteristic of filter 15 ensures suitable display parameters in the single mode approach. The dye-based material can be sealed to protect it from the environment after application.

Figure 7:
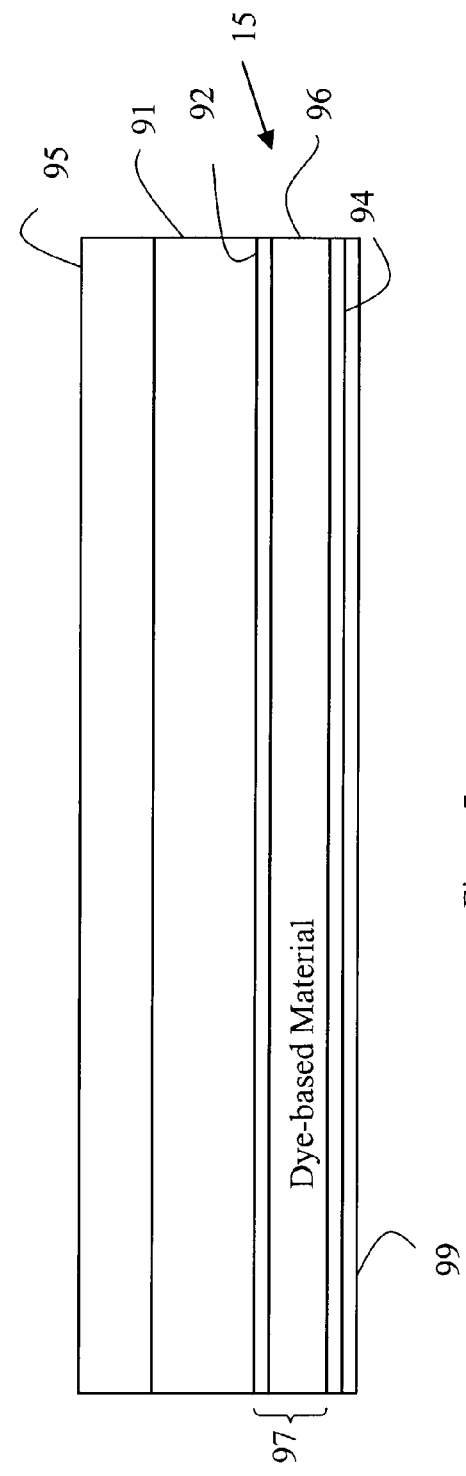
FIG. 7 is a more detailed side view of an embodiment of the dye-based filter illustrated in FIG. 1 in accordance with still another exemplary embodiment.

In FIG. 7, the dye-based filter 15 includes a polyester film 92 and a polyester film 94 including the dye-based material 96. Dye-based material 96 is preferably a material as discussed with respect to FIG. 1 and Examples 1–10. Examples 9–10 include UVA.

In one embodiment, filter 15 includes an anti-reflection and/or anti-glare treatment layer 95, an electromagnetic interference attenuation layer 91, substrate or film 92, dye material 96, substrate or film 94, and long wavelength blocking filter 99. A stack 97 includes films 92 and 94 and material 96. Layer 95 minimizes spectral specular reflectance over a wide range of incident angles and minimizes the spatial coherence of reflected images. Layer 91 attenuates radio frequency electromagnetic emissions from display system 10 and can be any type of conductive coating. Film 92 can be rigid or flexible. In one example, filter 15 is designed for application over an emissive display having a curved face. Preferably, film 92 has a reflective index between 1.3 and 1.8 and is matched to the refractive index of material 96. Preferably, the internal transmission of layer 92 is greater than 80 percent in the wavelength range between 420 nm to 630 nm.

Layer 95 can be a polycarbonate bulk, polyester bulk, or embossed micro structure diffuser. Layer 91 can be an EMI high-efficiency anti-reflective conductive coating. The combination of layers 95 and 91 can be an anti-glare high efficiency anti-reflective (HEA) coating.

As discussed above, layer 96 provides a sharp spectral cutoff near 610 nm, with a 50% transmittance at 630 nm, and minimized display emission in the 630 nm to 750 nm wavelength range. Layer 94 is similar to layer 92. Layer 99 provides attenuation of display emissions in the range of 745 nm to 1,000 nm. The functionality of layers 95, 91 and 92 can be combined, and the functionality of 94 and 99 can also be combined. The desired spectrum functionality associated with layer 99 can be achieved using multiple layers, absorptive layers, or reflective materials. In one embodiment, layer 99 is a thin dielectric stack.

Film 92 can also be a linear or a circular polarizer. In certain applications, filter 15 is used in front of an emissive display and film 92 is a circular polarizer. When used in this way, specular reflections from the emissive display are minimized and high ambient contrast ratio improved. When film 92 is a linear or circular, it is preferable to have an internal transmission greater than 45%.

Figure 8:
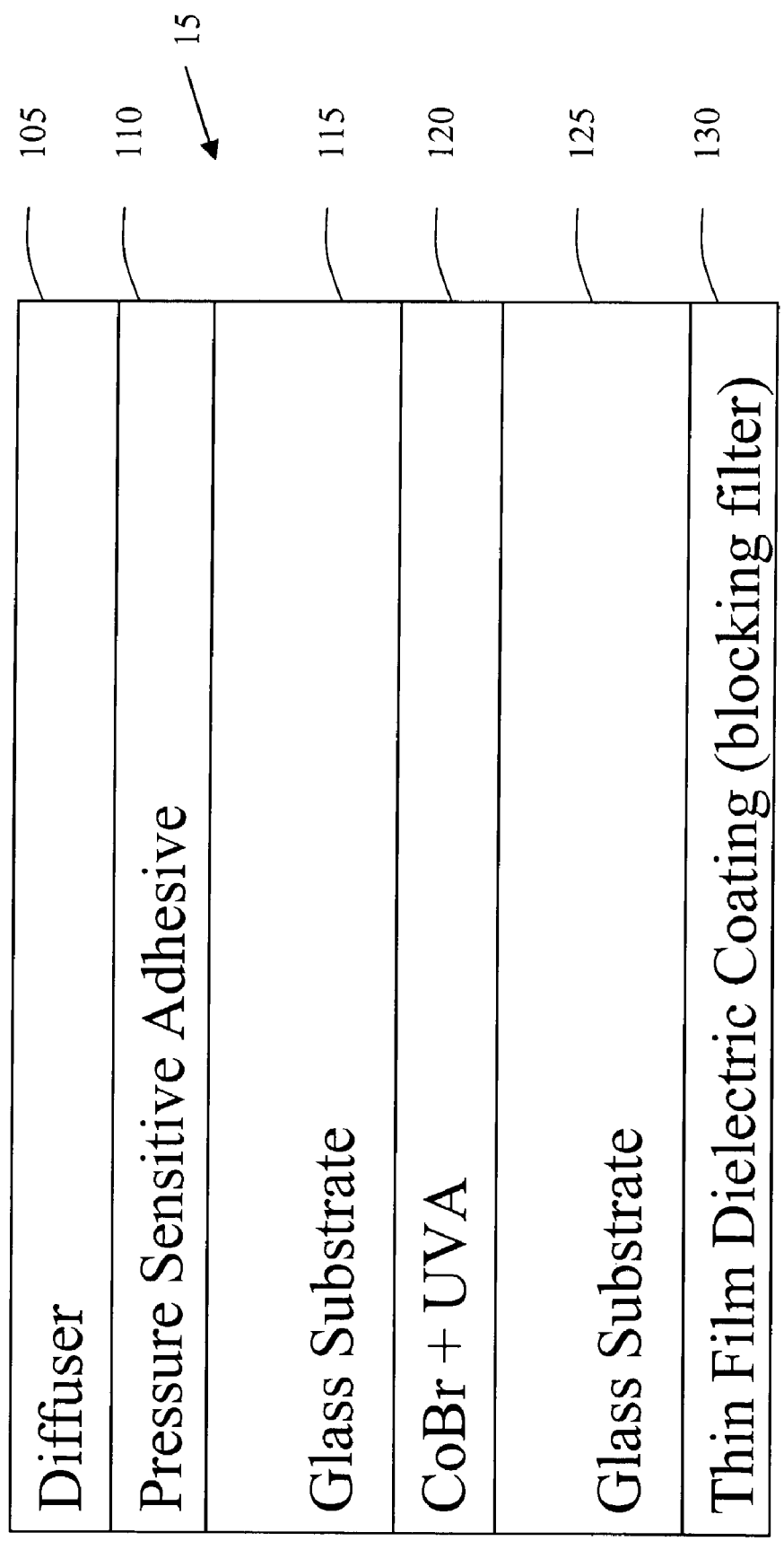
FIG. 8 is a more detailed side view of another embodiment of the dye-based filter illustrated in FIG. 1 in accordance with still another exemplary embodiment.

In FIG. 8, dye-based material 15 is provided in a layer 120. Layer 120 is preferably provided between a glass substrate 115 and glass substrate 125. Glass substrates 115 and 125 can be manufactured by Corning, Inc. A thin dielectric coating or blocking filter 130 can be provided below substrate 125. Filter 130 preferably is an inexpensive filter for blocking wavelengths greater than 700 nm.

A diffuser 105 is preferably attached by a pressure-sensitive adhesive 110 to substrate 115. Filter 130 does not have to have a precise cutoff frequency due to the use of layer 120. Preferably, the cutoff frequency is below the cutoff frequency associated with layer 120. In this way, an inexpensive filter 130 can be attached to complete the NVIS filter.

Applicants have applied a filter according to FIG. 8 in front of one-half of an array of LEDs and a conventional NVIS filter in front of the other half of the array. Applicants have found that the half of the display covered by the filter of FIG. 8 provides greater red chromaticity and brightness than the portion of the array of LEDs covered by the conventional filter. Additionally, applicants have found that the half of the display covered by the filter of FIG. 8 has equal or better NVIS performance than the portion of the array of LEDs covered by the conventional filter.

Figure 17:
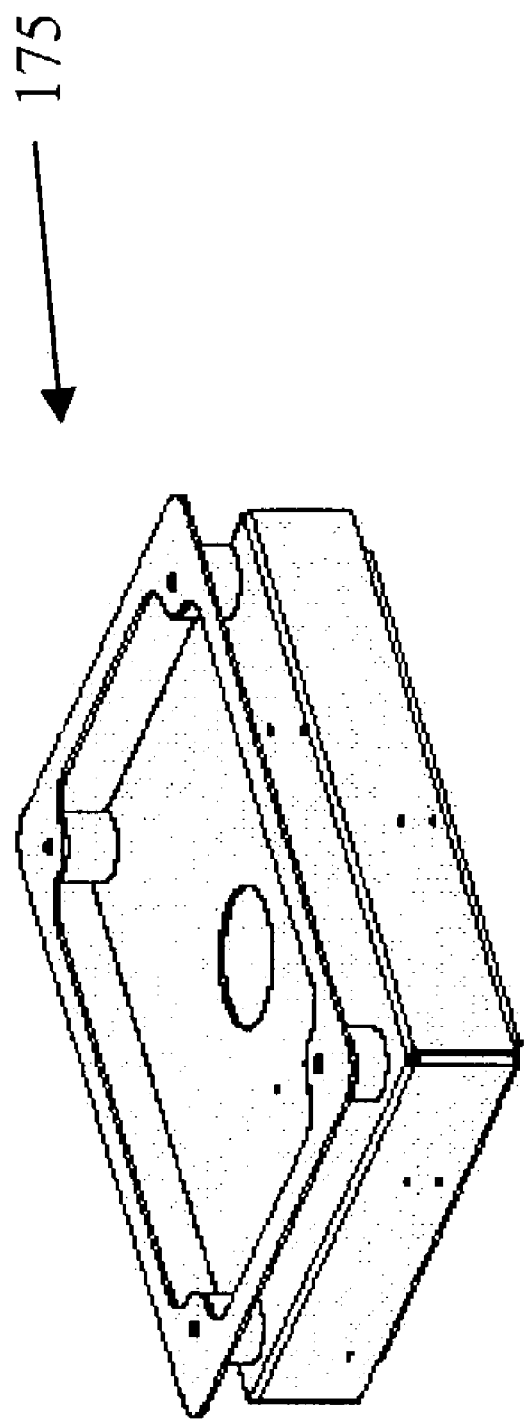
FIG. 17 is a top view of a fixture for manufacturing the filter illustrated in FIG. 1, in accordance with yet another exemplary embodiment.

With reference to FIGS. 17 and 18, a fixture 175 can be used to manufacture filter 15, such as filter 15 described with reference to FIGS. 7 and 8. With reference to FIG. 18, fixture 175 includes cover 183 and a carrier or fixture member 185. Fixture member 185 receives a translucent plate 197.

A plate 195 is provided adjacent plate 197 with spacers 187 between plates 195 and 197. Pins 189 are provided through apertures in plate 197 and into fixture member 185. A bell jar with suitable vacuum capability of 10 torr or less can be utilized during the fabrication of filter 15.

Spacers 187 can be 0.10 inch thick split washers or equivalents. Plates 195 and 197 can be a glass material of varying size, an example has dimensions of 8.5 inches by 6.325 inches. Spacers 187 can also be split washers with tighter thickness tolerances.

A mixture for the filter material is prepared using a pre-mixed material consisting of bis(methyltrioctylammonium) tetrabromcobaltate, propoxylated trimethylolpropane triacrylate, 2-hydroxyethyl methacrylate, methacryloxypropyltris(trimethylsiloxy)siloxane, methyltrioctylammonium bromide, benzildimethyl ketal. The pre-mixed material is mixed using a magnetic stirrer, or equivalent stirring device, and approximately 16.0–16.5 grams of material (for the example size) is weighed out in a separate container. The container with material is evacuated until stability is achieved (typically evacuated for approximately 3–5 minutes for 16–16.5 grams of material).

Plate 197 is placed in fixture 185. At least four spacers such as spacers 187 are placed in each corner of plate 197 over pins on fixture element 185 and fully seated against plate 197. The evacuated material is poured onto a cleaned surface of plate 197 in a pattern to achieve uniformity. Fixture 185 is manipulated to carry flow of the material over the entire substrate or plate 197. Precautions are taken to minimize runoff and pooled material is provided along a long edge of plate 197. A cleaned substrate or plate 195 is hinged along the long edge of the fixture and slowly allowed to settle against all four spacers 187. Material flow must be monitored to minimize bubble formation and allow a uniform bond-line to form.

Cover 183 is applied carefully and the bond-line is allowed to stabilize for 5–8 minutes. Thereafter, lid or cover 183 is removed and shims are carefully removed without disturbing the bond-line. Fixture element 185 is placed into a dry box with adequate flow of nitrogen blanketing fixture 187 to eliminate contamination of edge cure by oxygen. UV lamps are provided for curing for approximately 15–20 minutes. Element 185 is then removed from the assembly of plates 195 and 197 carefully to prevent cracking of substrates or stressing the bond-line.

Assembly of layers 195 and 197 are then placed in an oven at 80° F. for one hour minimum to stabilize optical properties. Alternatively, stabilization can occur at room temperature after a minimum of approximately 72 hours.

Figure 14:
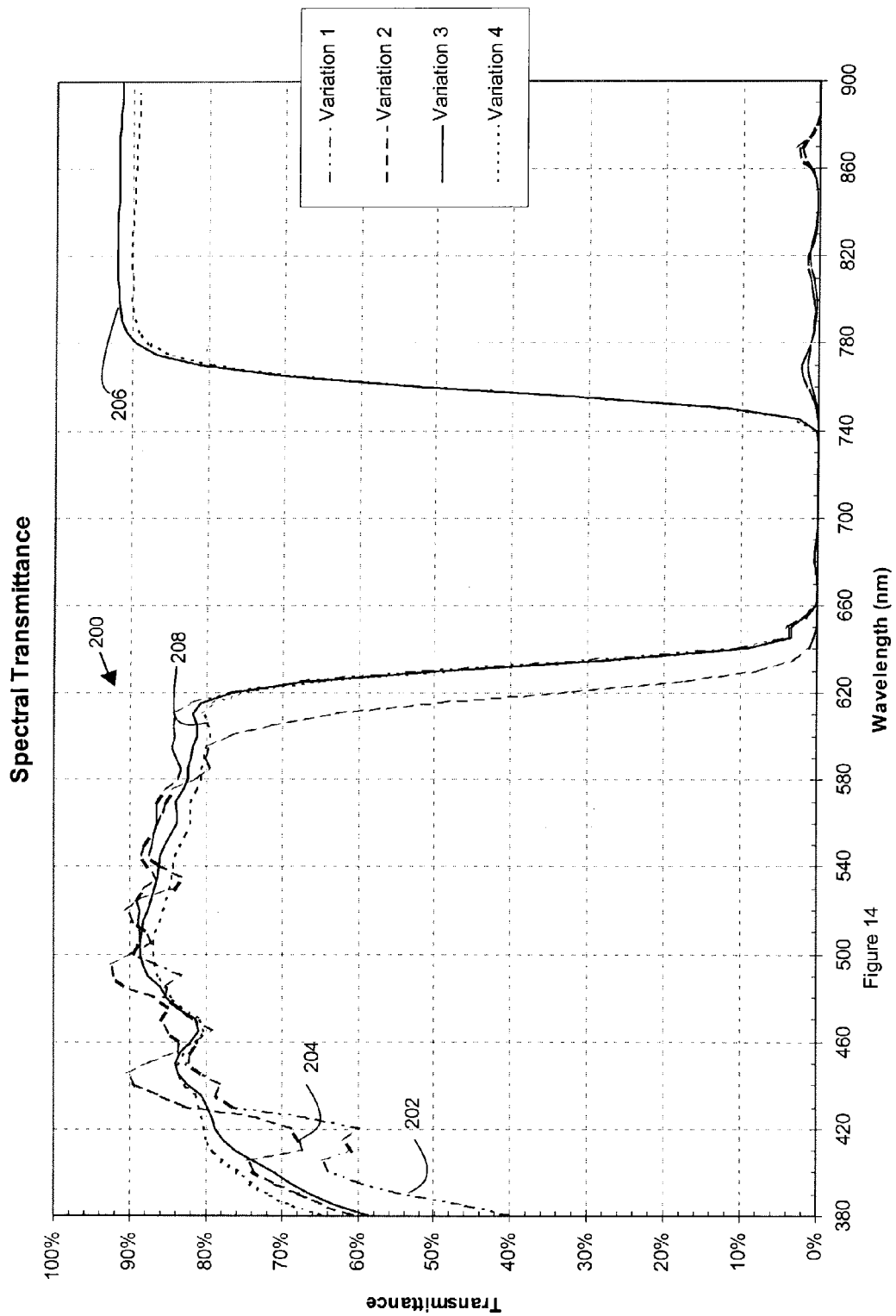
FIG. 14 is a graph showing spectral transmittance for embodiments of the dye-based filter illustrated in FIG. 1.

With reference to FIG. 14, a graph 200 includes a line 202 representing Variation 1 of filter 15, a line 204 representing Variation 2 of filter 15, a line 206 representing Variation 3 of filter 15, and a line 208 representing Variation 4 of filter 15. An X-axis of graph 200 represents wavelengths from 380 nm to 900 nm and a Y-axis represents transmittance from 100% to 0% on a linear scale.

Variation 1 is an NVIS filter having a thickness of 0.01 inches of formulation A with a secondary NVIS thin film (see film 130 FIG. 8). Formulation A is described in Example 9. Variation 2 is an NVIS filter of formulation B with a thickness of 0.0125 and a secondary NVIS thin film (130). The dye of formulation B is described in Example 5. The UVA of formulation B is the same UVA as detailed in Example 10.

Variation 3 is an NVIS filter having a thickness of 0.0105 inches having formulation A. Variation 4 is an NVIS filter having formulation A and having a thickness of 0.012 inches.

Filter 15 can be designed in accordance with the exponential law governing optical absorption.

$$T(\lambda) = \exp\{\alpha(\lambda) \cdot d / \cos(\theta)\}$$

Where:

$T(\lambda)$ is the internal transmission as a function of wavelength.

$\alpha(\lambda)$ is the materials absorption coefficient as a function of wavelength.

d is the filter thickness in the normal direction.

θ is angle of incidence measured from the normal direction.

When the tetrabromocobalt composition is added to a host material like PMMA or UVA (Examples 1–10), the absorption coefficient is a weighted average having the formula $$(\lambda) = C \cdot \alpha_{CoBr}(\lambda) + (1-C) \cdot \alpha_{Host}(\lambda)$$

where C is a number between 0 and 1 describing concentration.

The reason the tetrabromocobalt filter has a unique sharp or steep cutoff starting at 610 nm is that the absorption coefficient $\alpha_{CoBr}(\lambda)$ rapidly increases to very large numbers between 610 nm and 750 nm. The rapid transition of $\alpha_{CoBr}(\lambda)$ is also the same factor that minimizes the spectral (color) shift over viewing angle.

TABLE 1

| (Secondary NVIS Filter) (film 130) | | |
|---|---|---|
| Wavelength Range | 0° θ < 25° | 25° θ ≦ 55° |
| 420 nm < λ < 630 nm | $T_\lambda$ > 85% | $T_\lambda$ > 75% |
| 630 nm ≦ λ ≦ 745 nm | No Requirements | No Requirements |
| 745 nm < λ < 935 nm | $T_\lambda$ < 10% | $T_\lambda$ < 10% |

As shown in FIG. 14, lines 202, 206 and 208 show that a 50% transmission at approximately 630 nm is achieved for filter 15. The transmittance is below 10% at wavelengths between 640 nm and 750 nm for Variations 3 and 4. Variation 2 has a 50% transmission at approximately 615 nm. Variations 3 and 4 achieve higher spectral transmissions at wavelengths higher than 740 nm due to the absence of the thin film NVIS filter (film 130). As shown in FIG. 7, a secondary NVIS filter (130) having a cutoff wavelength somewhere above 660 nm and below 740 nm can be used to maintain low transmittance at wavelengths higher than 740 nm for the entire filter. Table 1 above provides typical requirements for a secondary NVIS filter (film 130).

Figure 15:
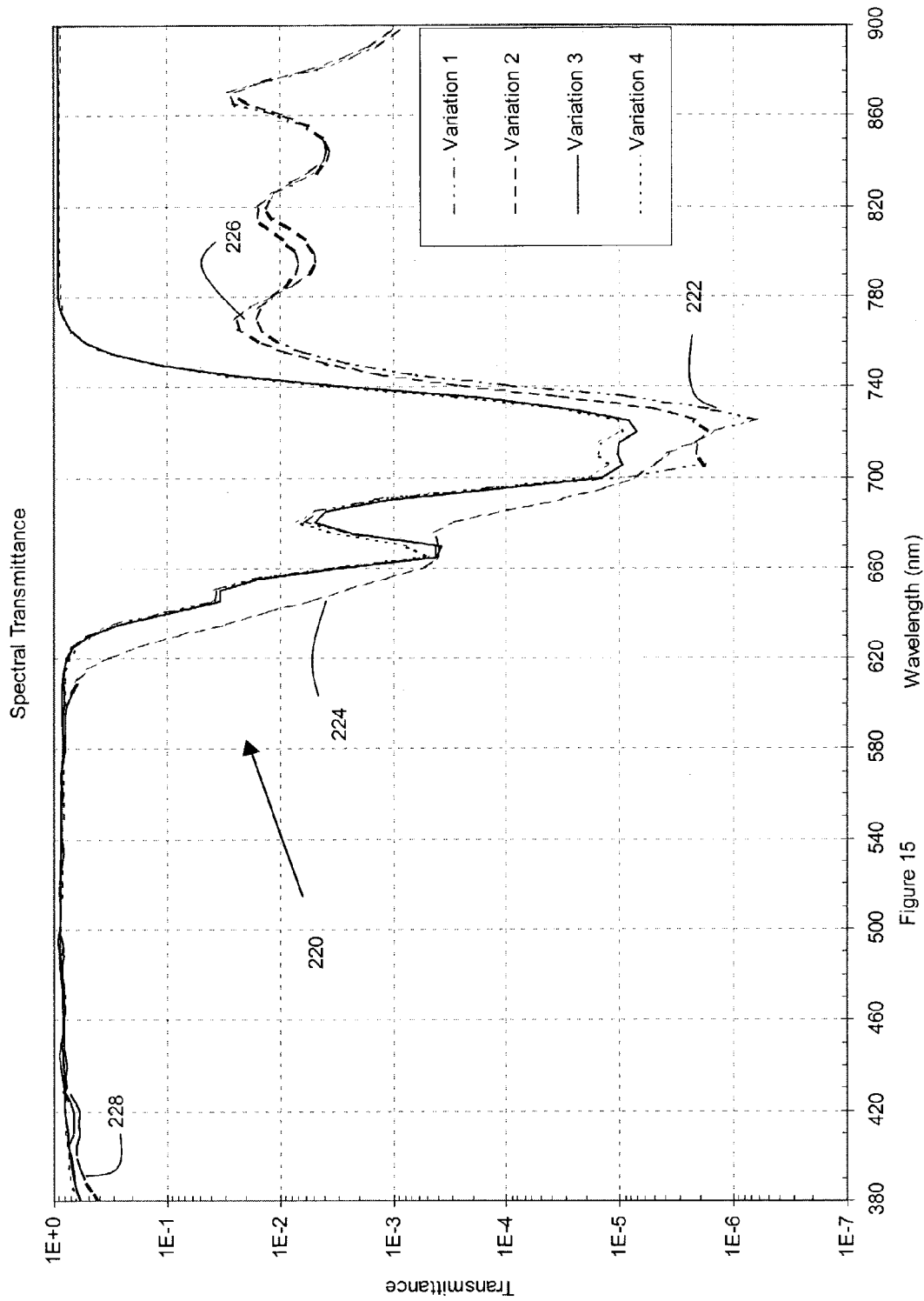
FIG. 15 is a graph showing spectral transmittance on a logarithmic scale of the embodiments of the dye-based filter illustrated in FIG. 1.

With reference to FIG. 15, a graph 220 shows an X-axis having a wavelength of 380 nm to 900 nm and a Y-axis showing transmittance in algorithmic scale from 1 to 0.00001. A line 222 shows transmittance for Variation 1, a line 224 shows transmittance for Variation 2, a line 226 shows transmittance for Variation 3, and a line 228 shows transmittance for Variation 4. Graph 220 shows the exceptional performance of Variations 1–4 of filter 15 between wavelengths of 660 and 740 nm.

Figure 16:
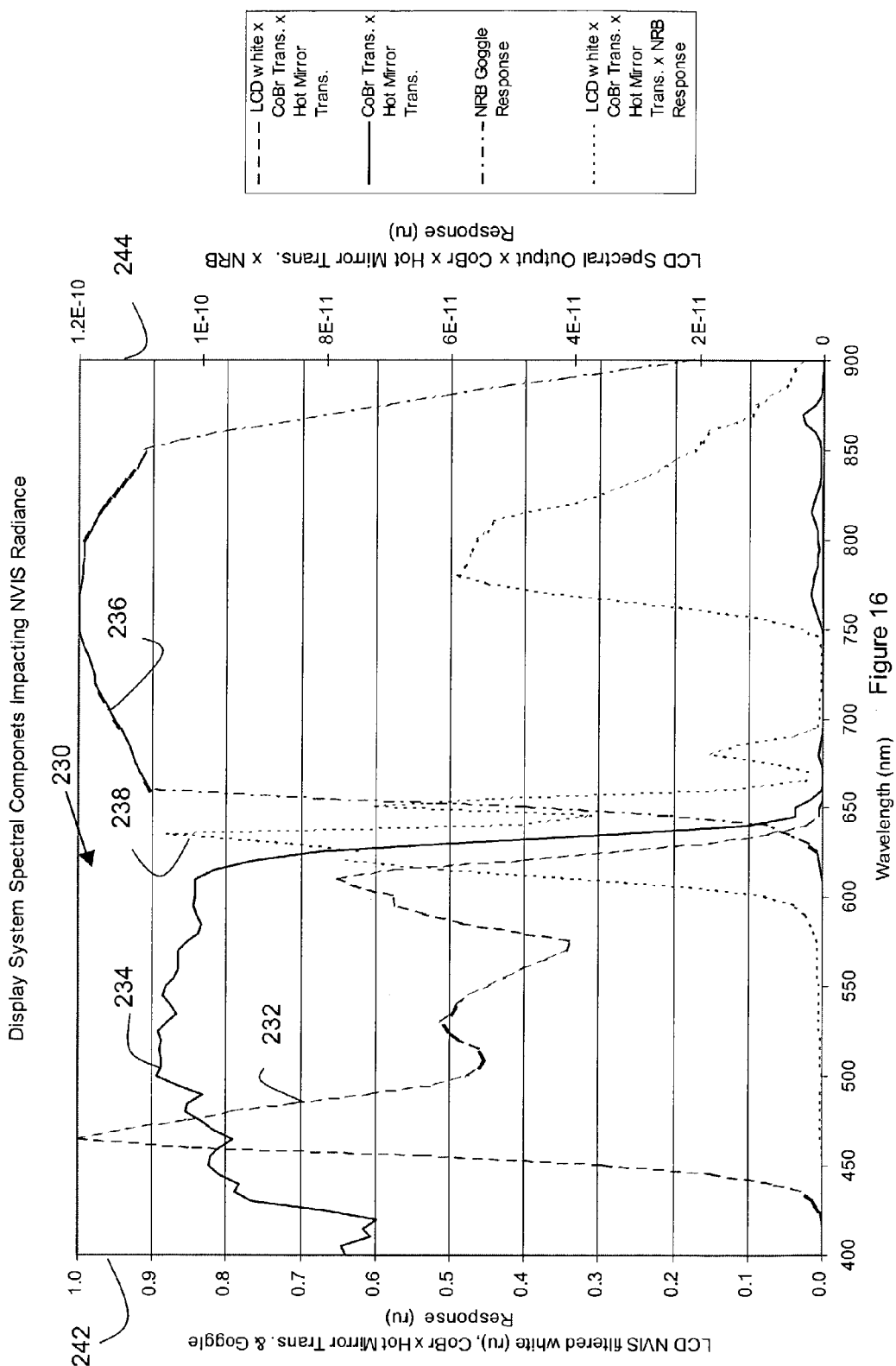
FIG. 16 is a graph showing spectral and emissions responses of an avionic display including the dye-based filter illustrated in FIG. 1.

With reference to FIG. 16, a graph 230 illustrates the spectral components associated with display system 10 (FIG. 2). A y-axis 242 provides a relative, linear scale for lines 232, 234 and 236. A secondary Y-axis 244 provides a relative, linear scale for line 238. Line 232 represents the spectral emissions from display system 10 such as embodied in FIG. 2. Line 232 is produced by the combination of light source 20, dye-based NVIS filter 15 and optical shutter 25. Light source 20 is an array of white and red LEDs mounted on a flexible circuit board and a heat sink. An embodiment of the construction of the dye-based NVIS filter 15 is illustrated in FIG. 8. The spectral characteristics of the dye-based NVIS filter 15, in this example, is shown by line 234 in FIG. 16.

Optical shutter 25 is an LCD displaying a full-field white format. The result is a spectral line 232 that is the product of light emitted from a white plus red LED array 20, filtered by a hybrid absorptive/reflective NVIS filter as embodied in FIG. 8, and then filtered and modulated by LCD 25. A unique and advantageous feature of spectral line 232 is strong red emission at 610 nm and the minimal emissions for wavelengths greater than 640 nm.

Line 236 shows the NVIS B goggle response. The goggle response increases rapidly for wavelengths longer than 630 nm. Applying the NVIS B goggle response 236 to the spectral output 232 of display system 10 produces line 238. The area under line 238 defines how strongly display system 10 stimulates (blooms) the NVIS B goggles. The area under line 238 is called NVIS Radiance (NRb). NRb results, for display system 10, are provided in Table 2. The results are well below the maximum allowable limits illustrating the excellent NVIS performance achievable with filter 15, while maintaining very good saturation of the red color format.

TABLE 2

| Format | u' | v' | NRb | MIL-L-85762A Limit |
|---|---|---|---|---|
| White | 0.19 | 0.48 | 1.4E−09 | 2.2E−09 |
| Red | 0.40 | 0.53 | 5.1E−09 | 1.1E−08 |
| Green | 0.13 | 0.56 | 9.1E−10 | 1.1E−08 |
| Blue | 0.12 | 0.27 | 3.4E−09 | 1.1E−08 |
| Black | 0.18 | 0.45 | 4.5E−10 | Not Specified |

Filter 15 can provide accentuation or attenuation in various frequency ranges. Although a preferred embodiment is described with respect to an infrared frequency range, any frequency range can be applicable to the principles described below. According to a preferred embodiment, filter 15 significantly attenuates radiation above a wavelength of 640 nm and does not significantly attenuate radiation below a wavelength of 630 nm. Alternatively, filter 15 can operate as a band pass filter having attenuation particular to a middle range. The type of filter utilized in system 10 is not described in a limiting fashion.

In another embodiment, light source 20 and shutter 25 can be replaced by a cathode ray tube (CRT), LED display, or other light source. In such an embodiment, filter 15 can be provided in front of the CRT, LED display, or other light source.

A particular type of display system 10 (FIG. 2) can be embodied as an avionic display system. The avionic display system can include an optical shutter or liquid crystal display (LCD), a diffuser, a light guide and filter 15. The system can also include a light source comprised of a night vision mode light source and a non-night vision light source. The system is preferably configured to be operated in a night vision mode (NVIS mode) and a non-night vision mode (daytime mode).

It is understood that while preferred embodiments and specific examples are given, they are for the purpose of illustration only and are not limited to the precise details disclosed. For example, although specific wavelengths of light are discussed, other types of light can be utilized. Various cutoff characteristics can be achieved. Further, although avionic display systems are discussed, other display systems requiring dye-based filters can utilize the principles of the present invention. Further, light management applications such as switch panels, lighted switches, bezel keys, flashlights and laser eye protection can utilize the principles of the present invention. Various modifications may be made in the details within the scope and range of equivalents of the claims without departing from what is claimed.

What is claimed is:

1. A display including a light source, the display comprising a dye-based filter material positioned to receive light from the light source, wherein the dye-based filter material absorbs light in the infrared range with respect to light in the visible range, the dye-based filter material having a sharp cutoff between 600 and 640 nm, wherein the dye-based filter material includes at least one salt of $MX_4^{2-}$ types where M is Co or Ni.

2. The display of claim 1, wherein the dye-based filter material provides night vision imagine system (NVIS) filtering.

3. The display of claim 2, wherein X is a halide.

4. The display of claim 3, wherein the dye-based filter material is mixed with a polymer.

5. The display of claim 1, further comprising:
   a plurality of light-emitting diodes serving as the light source.

6. The display of claim 5, wherein at least one of the plurality of light-emitting diodes is coated with the dye-based filter material.

7. The display of claim 6, wherein the plurality of light emitting diodes are arranged in an array and a pattern within the may of light emitting diodes is coated with the dye-based filter material.

8. The display of claim 5, wherein at least one of the light emitting diodes has a lens formed with dye-based material mixed with polymer.

9. An avionic display system, comprising:
   a display configured to provide visual images in the visual frequency range; and
   a dye-based filter material positioned to receive light associated with the visual images, the dye-based filter material attenuating light in the near-infrared and infrared range, wherein the dye base filter material includes at least one salt of $MX_4^2$ where X is a halide and M is a metal.

10. The avionic display system of claim 8, wherein the light source includes light emitting diodes and the dye-based filter material is coated on the light emitting diodes.

11. The system of claim 9, wherein the dye-based filter material is a copper or cobalt dye material.

12. The display system of claim 9, further comprising a filter for attenuating light at wavelengths above 750 nm.

13. A method of manufacturing a display, the method comprising:
   providing a light source; and
   coating the light source with a film that receives light from the light source with a dye-based filter material, wherein the dye-based filter material attenuates light in the infrared range, wherein the dye-based filter material includes a dye including a polymer host doped with combinations of at least one of $CoCl_4^{2-}$ and $CoBr_4^{2-}$.

14. The method of claim 13, further comprising:
providing an overcoat to the dye material to seal from the environment.

15. The method of claim 14, wherein the dye-based filter material includes at least one methyltrioclylammonium.

16. The method of claim 14, wherein the light source is an array of light emitting diodes and at least one of the light emitting diodes is coated.

17. A display system, comprising:
means for providing a visual image; and
means for filtering light to absorb the light associated with the visual image above a selected wavelength range, wherein the selected wavelength range is above 610 nm, wherein the means for filtering includes a member of the family of tetrahedrally-coordinated metal ions of $d^7$ cobalt (2+) and $d^8$ nickel (2+), where d signifies the electron configurations of divalent (2+) metal ions.

18. A night vision imaging system NVIS filter, comprising:
a monomer or polymer host; and
a dye, the host being doped with the dye, the filter absorbing light in the near-infrared and infrared range and allowing light in the visible range to pass, wherein the filter includes a member of the family of tetrahedrally-coordinated metal ions of $d^7$ cobalt (2+) and $d^8$ nickel (2+), where d signifies the three electron configurations of divalent (2+) metal ions.

19. The filter of claim 18, wherein the filter attenuates light between a wavelength of 640 nm and 740 nm to a level below 10%.

20. The filter of claim 18 further comprising:
a pair of translucent films, wherein at least one of the translucent films are polarized.

21. The filter of claim 18 further comprising:
a blocking filter providing attenuation in the range of 745 nm to 1000 nm.

* * * * *